US010528532B2

(12) United States Patent
Papotti et al.

(10) Patent No.: US 10,528,532 B2
(45) Date of Patent: Jan. 7, 2020

(54) SYSTEMS AND METHODS FOR DATA INTEGRATION (71) Applicant: Qatar Foundation, Doha (QA)

(72) Inventors: Paolo Papotti, Doha (QA); Felix Naumann, Doha (QA); Sebastian Kruse, Doha (QA); El Kindi Rezig, Doha (QA)

(73) Assignees: Qatar Foundation, Doha (QA); Hasso-Plattner-Institut Für Softwaresystemtechnik GmbH, Potsdam (DE)

( * ) Notice: Subject to any disclaimer, the term of this patent is extended or adjusted under 35 U.S.C. 154(b) by 1001 days.

(21) Appl. No.: 14/905,240

(22) PCT Filed: Jun. 30, 2014

(86) PCT No.: PCT/GB2014/051983
§ 371 (c)(1),
(2) Date: Jan. 14, 2016

(87) PCT Pub. No.: WO2015/008026
PCT Pub. Date: Jan. 22, 2015

(65) Prior Publication Data
US 2016/0154830 A1 Jun. 2, 2016

(30) Foreign Application Priority Data

Jul. 17, 2013 (GB) .................... 1312776.6

(51) Int. Cl.
G06F 17/30 (2006.01)
G06F 16/215 (2019.01)
G06F 16/28 (2019.01)
(52) U.S. Cl.
CPC ......... *G06F 16/215* (2019.01); *G06F 16/284* (2019.01)

(58) Field of Classification Search
None
See application file for complete search history.

(56) References Cited

U.S. PATENT DOCUMENTS 7,814,470 B2 * 10/2010 Mamou ................ G06F 16/254
717/162
7,984,052 B2 * 7/2011 Griffith .................... G01W 1/00
707/736

(Continued)

FOREIGN PATENT DOCUMENTS

WO 2004019221 A2 3/2004

OTHER PUBLICATIONS

Seckin Tunalilar: "EFES" An Effort Estimation Methodology, Sep. 1, 2011; Retrieved from the Internet: URL: http://etd.lib.metu.edu.tr/upload/12613847/index.pdf [retrieved on Oct. 21, 2014] Section 3.5.4.3; p. 85.

(Continued)

*Primary Examiner* — Hung D Le
(74) *Attorney, Agent, or Firm* — Benesch, Friedlander, Coplan & Aronoff LLP (57) ABSTRACT A computer implemented method for integrating data into a target database may include: providing a plurality of source databases which each may include a relational schema and data for integration into the target database; generating at least one complexity model based on the relational schema and data of each source database, each complexity model indicating at least one inconsistency between two or more of the data sources which may be require to be resolved to integrate the data from the data sources into the target database; and generating an effort model that may include an effort value for each inconsistency indicated by each complexity model, each effort value indicating at least one of a time period and a financial cost to resolve the inconsistency (Continued)

to integrate data from the data sources into the target database.

15 Claims, 7 Drawing Sheets

(56) References Cited

U.S. PATENT DOCUMENTS

| | | | | |
|---|---|---|---|---|
| 7,987,159 | B2* | 7/2011 | Gopal | G06F 16/254 707/687 |
| 2005/0262188 | A1* | 11/2005 | Mamou | G06F 16/254 709/203 |
| 2006/0059137 | A1 | 3/2006 | Walker | |
| 2006/0259442 | A1* | 11/2006 | Iqbal | G06F 16/21 705/400 |
| 2008/0071844 | A1* | 3/2008 | Gopal | G06F 16/254 |
| 2008/0313224 | A1* | 12/2008 | Griffith | G01W 1/00 |
| 2009/0216717 | A1* | 8/2009 | Suereth | G06F 16/00 |
| 2009/0282042 | A1* | 11/2009 | Russell | G06F 8/71 |
| 2010/0217759 | A1* | 8/2010 | Ma | G06F 16/2282 707/719 |
| 2010/0312737 | A1* | 12/2010 | Coldicott | G06F 16/21 706/45 |
| 2012/0089562 | A1* | 4/2012 | Deremigio | G06F 16/254 707/602 |
| 2012/0095957 | A1* | 4/2012 | Reddy | G06F 16/256 707/602 |
| 2012/0095973 | A1* | 4/2012 | Kehoe | G06F 8/70 707/694 |
| 2013/0325790 | A1* | 12/2013 | Srinivasan | G06F 16/283 707/602 |
| 2016/0004753 | A1* | 1/2016 | Schmidt | G06Q 30/02 707/691 |

OTHER PUBLICATIONS

Seckin Tunalilar, et al: "EFES" An Effort Estimation Methodology, Software Measurement and the 2012 Seventh International Conference on Software Process and Product Measurement (IWSM-MENSURA), 2012 Joint Conference of the 22nd International Workshop on, IEEE, Oct. 17, 2012, pp. 205-214,"Effort Estimation Process"; p. 210, line 32-line 45.

International Search Report and Written Opinion related to International App. No. PCT/GB2014/051983.

* cited by examiner

(a) Schemas, constraints, and correspondences.

FIG. 3a

| record | title | duration |
|---|---|---|
| 1 | "Sweet Home Alabama" | "4:43" |
| 1 | "I Need You" | "6:55" |
| 1 | "Don't Ask Me No Questions" | "3:26" |
| ... | | |

(b) Example instances from the target table tracks.

FIG. 3b

| album | name | artist_list | length |
|---|---|---|---|
| s3 | "Hands Up" | a1 | 215 |
| s3 | "Labor Day" | a1 | 238 |
| s3 | "Anxiety" | a2 | 218 |
| ... | | | |

(c) Example instances from the source table songs.

SYSTEMS AND METHODS FOR DATA INTEGRATION

CROSS-REFERENCE TO RELATED APPLICATIONS

This application is a National stage entry under 35 U.S.C. § 371 of PCT Patent Application No. PCT/GB2014/051983, filed Jun. 30, 2014, which is an international application of UK Patent Application No. GB1312776.6, filed on Jul. 17, 2013, both of which are incorporated entirely by reference herein.

BACKGROUND

The present disclosure relates to methods and systems for improving data integration, and more particularly relates to methods and systems for improving data integration and cleansing by estimating the effort required to integrate data into or cleanse data in a target database.

Data integration and data cleansing remain among the most human-work-intensive tasks in data management. Both require a clear understanding of the semantics of schema and data—a notoriously difficult task for machines. Despite much research and development of supporting tools and algorithms, state of the art integration projects involve significant human resource cost. In fact, it is reported that 10% of all IT cost goes into enterprise software for data integration and data quality, and it is well recognized that most of those costs are for human labor.

However, project estimation for data integration projects can be especially difficult, given the number of stakeholders involved across the organization as well as the unknowns of data complexity and quality. Any integration project can have many steps and tasks, including requirements analysis, selection of data sources, determining the appropriate target database, data transformation specifications, testing, deployment, and maintenance.

The embodiments described herein can provide improved methods and systems for estimating data integration and cleansing effort.

SUMMARY

When embarking on a data integration and cleansing project it can be useful and important to estimate in advance the effort and cost of the project. Such estimations help deciding whether to pursue the project in the first place, planning and scheduling the project using estimates about the duration of integration steps, budgeting in terms of cost or manpower, and finally monitoring the progress of the project. Cost estimates also help integration service providers, IT consultants, and IT tool vendors to generate better price quotes for integration customers. Further, automatically generated knowledge of how well and how easy a data source fits into a given data ecosystem improves source selection.

According to one aspect of the present disclosure, there is provided a computer implemented method for integrating data into a target database, the method comprising: providing a plurality of source databases which each comprise a relational schema and data for integration into the target database; generating at least one complexity model based on the relational schema and data of each source database, each complexity model indicating at least one inconsistency between two or more of the data sources which must be resolved to integrate the data from the data sources into the target database; generating an effort model comprising an effort value for each inconsistency indicated by each complexity model, each effort value indicating at least one of a time period and a financial cost required to resolve the inconsistency to integrate data from the data sources into the target database; and integrating data from at least one of the source databases into the target database.

According to one or more embodiments described herein, the method further comprises optimising the integration of data into the target database by comparing the effort values for a plurality of data sources and selecting at least one data source that produce a minimum effort value for integration into the target database.

According to one or more embodiments described herein, the method further comprises outputting at least one effort value to a user for the user to determine from the effort value the effort required to integrate data into the target database.

According to one or more embodiments described herein, the step of generating the effort model is configurable with respect to the expected quality of the integration of data into the target database.

According to one or more embodiments described herein, the step of generating the effort model is configurable with respect to specified execution settings.

According to one or more embodiments described herein, the method further comprises generating a graph based complexity map which indicates the parts of the schema of the target database that are most complex.

According to one or more embodiments described herein, the step of generating the complex model is independent of the language used to express the data transformation, the expressiveness of the data model and the constraint language.

According to one or more embodiments described herein, the step of generating the complexity model comprises inspecting a plurality of single attributes of each data source.

According to one or more embodiments described herein, the method comprises generating a plurality of complexity models based on the relational schema and data of each source database.

According to one or more embodiments described herein, the method further comprises receiving at least one sub-model for use with each effort model and each complexity model to exchange, improve or extend each effort model or each complexity model.

According to one or more embodiments described herein, the method comprises receiving a plurality of data complexity sub-models, each data complexity sub-model representing the data integration scenario with respect to one certain complexity aspect.

According to another aspect of the present disclosure, there is provided a tangible computer readable storage medium storing instructions which, when executed by a computer, cause the computer to perform any of the methods provided herein.

According to a further aspect of the present disclosure, there is provided a system for integrating data into a target database, the system comprising computing device which incorporates a processor and a memory, the memory storing instructions which, when executed by the processor, cause the processor to perform any of the methods provided herein.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Data cleansing and data integration have been the topic of intensive research for at least the past thirty years, resulting in a multitude of specialized methods and integrated tool suites. All of them require at least some and in most cases significant human input in their configuration, during processing, and for evaluation. In fact, an entire industry has evolved, specializing in the configuration and installation of such commercial tools.

Without being bound to theory, it is believed that for managers (and for developers and scientists) it would be useful to estimate the effort of cleansing and integrating some given data sets. Such estimations about an integration project may help deciding about a project using cost/benefit analysis, planning the project with estimates about the duration of the integration process, budgeting a project with funds and manpower, and monitoring its progress. Further, knowledge of how well and how easy a data source fits into a given data ecosystem may improve source selection.

The present disclosure provides measures and methods for estimating integration complexity and ultimately effort, taking into account heterogeneities of both schemata and instances and regarding both integration and cleansing operations. In addition, some embodiments may utilize "Efes," which may be defined as an extensible framework for the automatic effort estimation for mapping and cleansing activities in data integration projects with multiple sources and possibly non-empty target databases.

Figure 1:
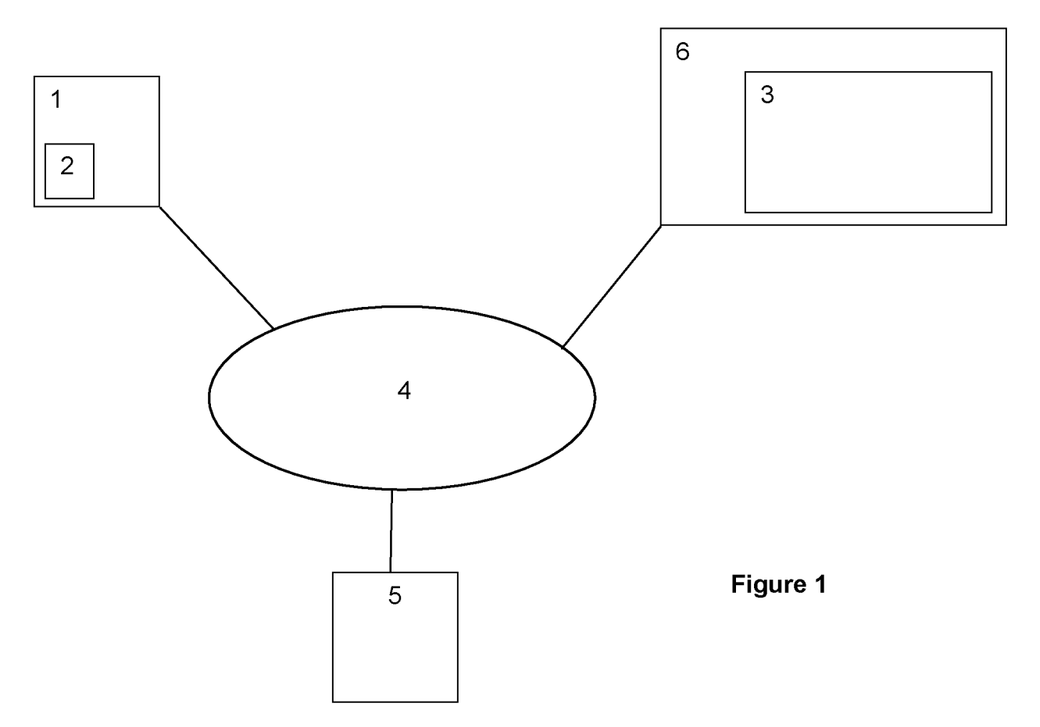
FIG. 1 schematically depicts a an exemplary implementation according to one or more embodiments shown and described herein, FIG. 2 schematically depicts a diagram showing an overview of a framework according to one or more embodiments shown and described herein, FIG. 3a schematically depicts an integration scenario for music record data according to one or more embodiments shown and described herein.

Referring to FIG. 1 of the accompanying drawings, an embodiment of the present disclosure may include a computing device 1. The computing device 1 may be configured to perform one or more functions or processes based on instructions which are received by a processor 2 of the computing device 1. The one or more instructions may be stored on a tangible computer readable medium 3 (e.g., a non-transitory computer readable medium) which may be part of the computing device 1. In some embodiments, the tangible computer readable medium 3 may be remote from the computing device 1, e.g., communicatively coupled therewith via a network 4 (such as the Internet).

In embodiments, the computing device 1 may be configured to perform one or more functions or processes on a dataset. The dataset may be stored on the tangible computer readable medium 3 or may be stored on a separate tangible computer readable medium 5 (which, like the tangible computer readable medium 3, may be part of or remote from the computing device 1). The tangible computer readable medium 5 and/or the tangible computer readable medium 3 may comprise an array of storage media. In some embodiments, the tangible computer readable medium 3 and/or the separate tangible computer readable medium 5 may be provided as part of a server 6 which is remote from the computing device 1 (but coupled thereto over the network 4).

The one or more instructions, in embodiments of the present disclosure, may cause the computing device 1 to perform operations in relation to the integration or cleansing of data in a target database. The operation of embodiments of the present disclosure is described below.

1.1 Estimation Framework

Figure 2:
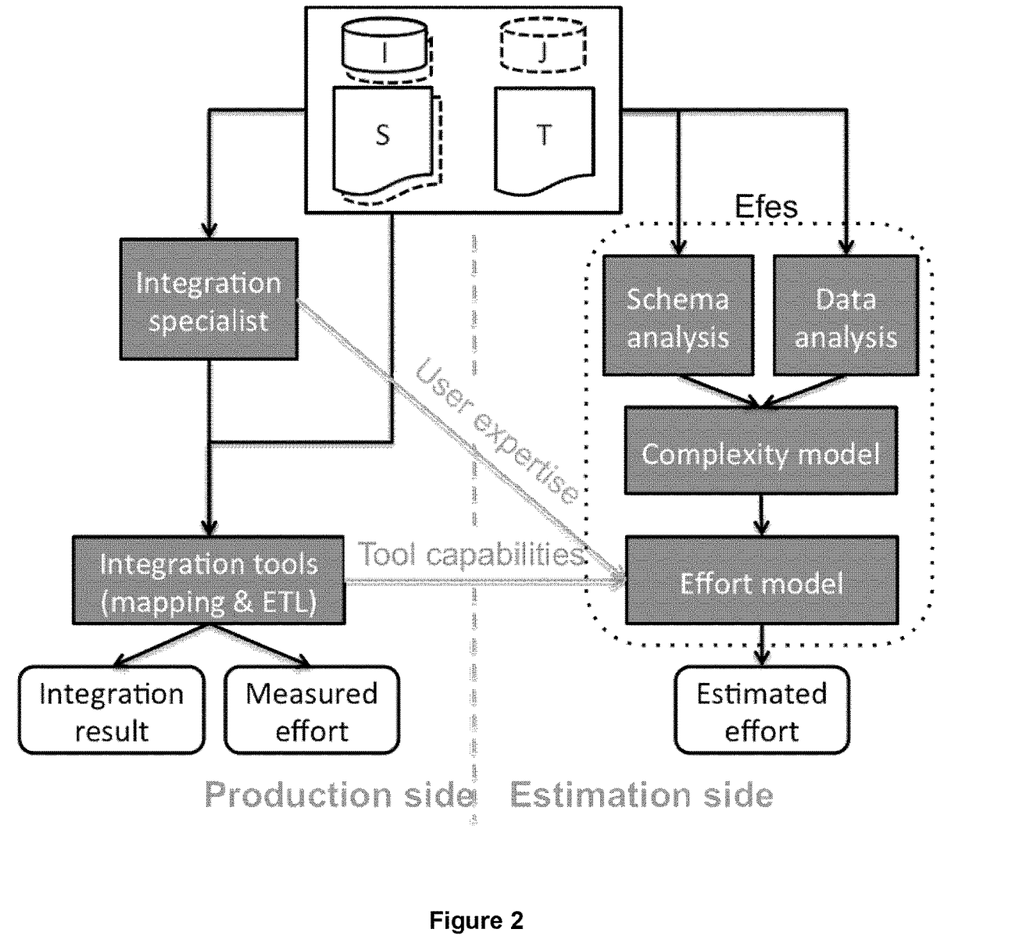

FIG. 2 shows an overview of a framework of an embodiment of the present disclosure to estimate integration effort. Given one or more source schemata S and corresponding source database instances I, and given a target schema T with or without a corresponding database instance J, the overall effort of migrating the source instance(s) to the target may be estimated. The model may support the case of multiple source schemata, that are to be integrated. The left-hand-side of FIG. 2 shows the actual, simplified integration process, in which an integration specialist (or a team of specialists) performs the integration. Typically, a set of integration tools are used by the specialist. These tools may have access to the source and target and support the specialist in creating the integration result. This process takes a certain amount of effort, which may be measured in different ways, for instance as amount of work in hours or days or in a monetary unit.

An embodiment of the present disclosure may estimate effort without actually performing the integration. Two connected models, shown on the right-hand-side of FIG. 2, may be utilized. The first model, the complexity model, may characterize the overall complexity of the integration by regarding source and target schemata and instances. The complexity model may be aided by the results of schema matching and data profiling tools, which may analyze the participating databases and produce metadata about them. The complexity model may be independent of external parameters, such as the level of expertise of the specialist or the available integration tools. The results of the complexity model may be useful on their own, even if not interpreted as a means to calculate actual effort:

Source selection: Given a set of integration candidates, our complexity model can help choose the most appropriate source, i.e., the one with the best 'fit'.

Complexity map: Fine-grained modeling may guide developers in exploring an integration scenario by highlighting those parts of the target schema that are the most complex.

The second model, the effort model, may build upon the complexity model to estimate the actual effort in some useful unit, such as workdays or cost. The effort model may take into account external parameters, such as the experience of the expert and the appropriateness and sophistication of the tools to be used, producing an effort estimate, but may exclude the integration result.

Note that integration tools may be used in this framework in two independent ways. First, integration tools, such as schema matchers or data profilers, may aid in the estimation of integration effort. For instance, a schema matcher may identify corresponding attributes between the schemas. Such information may feed into the complexity model. Second, tools may aid developers actually performing the integration, thus decreasing the overall integration effort. Information about the available tools may feed into the effort model to derive actual integration cost. It is not necessary to make the assumption that the same set of tools is used in both cases—they may be completely independent.

1.2 Challenges

Multiple approaches may be used to estimate in isolation the complexity coming from the mapping process and the one coming from the cleansing task. For the first one, evaluating the complexity of the matching among the schema may be a natural solution, for instance by using a matcher and counting the resulting matchings among elements. Similarly for the cleansing problem, a natural solution may be to measure the complexity of the constraints on the target schema by counting them. However, these two problems are complex in nature because of their interaction. The notion of data exchange provides an example to show this problem. A data exchange problem may take as input two relational schemata, a transformation between them, and a set of target constraints. The data exchange problem may answer two questions: whether it is possible to compute a valid solution for the setting and how. Interestingly, in order to have a solution for the relational case certain conditions must hold on the constraints on the target schema, and extending the setting to more complex languages and data models may bring tighter restrictions on the class of tractable cases.

One challenge addressed by embodiments of the present disclosure is to go beyond these ad-hoc studies for specific cases and models while satisfying four requirements:

The effort estimation may be required to be independent of the language used to express the data transformation, the expressiveness of the data model at hand, and the language used for the constraints.

Very often developers specify at the schema level only a small subset of the constraints that hold on the data. In fact, business rules are commonly enforced at the application level and are not reflected in the metadata of the schemas. Effort estimation may be required to include the effort of making source data comply with all relevant target constraints.

Real cases often do not fit the conditions considered in formal frameworks, but an estimation may be desirable for them, including edge cases that would fail the existence of solution test (e.g., the weak acyclicity syntactic condition in data exchange).

Developers may be required to be able to extend the range of problems covered by the framework with a plug-and-play approach where only few specifications of the new problem have to be specified.

While the above requirements may go far beyond the existing exact techniques, an embodiment of the present disclosure may handle them. The embodiments provided herein may estimate the complexity of a scenario, i.e., an embodiment is not necessarily trying to compute an exact solution or to test its existence. In fact, the embodiments described herein may be independent of the languages used in the scenario, and may be unrestricted to sound settings. Additionally, any new problematic aspect of the scenario may be plugged to the framework by adding a new model in a plug-and-play fashion. Moreover, in order to improve the quality of the prediction, the data may be profiled to discover constraints both on source and target schemata. The embodiments provided herein are not limited by the expressibility of the data model at hand.

1.3 Contributions and Structure

With the integration effort estimation framework and method described herein may systematically address dimensions of data integration and cleansing such as, but not limited to:

A complexity model for data integration and cleansing tasks.

A graph-based model to characterize the schematic "fit" of two schemata.

A compilation of individual cleansing tasks, methods to detect their necessity, and a characterization of their complexity.

An effort model that translates instances of the complexity model into an effort estimation based on the integration environment (tools and expertise).

A case study and experimental validation of the proposed techniques in our extensible Effort Estimation framework (Efes).

2 Related Work

When surveying computer science literature, a general pattern becomes apparent: much technology claims to reduce human effort. The veracity of this claim may be asserted as—any kind of automation of tedious tasks is usually helpful. However, the absolute measures of effort and its reduction may be difficult to explain or measure.

General Effort Estimation

A well established and detailed model to estimate the cost of software is COCOMO and its successor COCOMO II. However, the estimate provided by such models neither considers information coming from the mapping nor from the datasets.

The approach of decomposing an overall work task into a smaller set of tasks has been called "work breakdown structure" and applied to application integration scenarios. Business requirements may be broken into sets of functional and non-functional requirements. Each requirement may be labeled with an effort class of simple, medium, or complex, and multiplied by the number of times this task must be executed.

In the ETL context, a project may be broken down into various subtasks, including requirements, design, testing, data stewardship, production deployment, warranty support, but also the actual development of the data transformations. For the latter, the number of source attributes may be used, and may be assigned a weighted set of tasks for each attribute (see Table 1). In sum, slightly more than 8 hours of work for each source attribute may be calculated.

TABLE 1

Tasks and effort per attribute.

| Task | Hours per attribute |
|---|---|
| Requirements and Mapping | 2.0 |
| High Level Design | 0.1 |
| Technical Design | 0.5 |
| Data Modeling | 1.0 |
| Development and Unit Testing | 1.0 |
| System Test | 0.5 |
| User Acceptance Testing | 0.25 |
| Production Support | 0.2 |
| Tech Lead Support | 0.5 |
| Project Management Support | 0.5 |

TABLE 1-continued

Tasks and effort per attribute.

| Task | Hours per attribute |
| --- | --- |
| Product Owner Support | 0.5 |
| Subject Matter Expert | 0.5 |
| Data Steward Support | 0.5 |

Alternatively or additionally, further criteria may be taken into account when estimating the effort of an integration project. These criteria can include some of the factors considered in the complexity model, such as, for example, number of different sources and types, de-duplication, and schema constraints, project management, deployment needs, and auditing. Alternatively or additionally, further factors that may influence the effort model, such as, for example, familiarity with source database, skill levels, and tool availability. It is noted that merely providing a list of factors is only a first step, whereas the described embodiments may provide concrete measures for the database-specific causes for complexity and effort. In fact, existing methods may lack a direct numerical analysis of the schemata and datasets involved in the transformation and cleansing tasks. The embodiments provided herein may consider: (i) the properties of the datasets at a fine grain, up to the single attributes, (ii) the interaction of the transformation (mapping) and the cleansing (integration) problems, or both.

Schema-oriented effort estimation may relate to multiple usages of schema matching tools beyond the concrete generation of correspondences for schema mappings. In particular "project planning" and "determining the level of effort (and corresponding cost) needed for an integration project" may be used. The distinctiveness of the involved schemata (i.e., $|S_B-S_A|$ and $|S_A-S_B|$) and their overlap (i.e., $|S_A \cap S_B|$) may be used as indicators. A similarity flooding algorithm for schema matching may be used as a measure to estimate how much effort it costs the user to modify the proposed match result into the intended result in terms of additions and deletions of matching attribute pairs.

Data-oriented effort estimation may relate to a calculation on the number of comparisons needed to be performed by human workers to detect duplicates in a data set. Accordingly, the estimate may depend on the way the potential duplicates are presented, in particular their order and their grouping. In some embodiments, the effort model may show that specific tooling changes the needed effort, independently of the complexity of the problem itself 3 An Effort Estimation Framework Data integration scenarios may host different challenges that must be overcome. Problems may arise in common activities such as, for example, the definition of mapping between different schemas, the restructuring of the data, and the reconciliation of their format.

3.1 Data Integration Scenario

A data integration scenario may comprise a target database, a set of source databases to be integrated into the target database, and some information on how these sources relate to the target.

Each source database may comprise a relational schema, an instance of this schema, and a set of constraints, which may be required to be satisfied by that instance. In some embodiments, constraints are not enforced on the schema level but rather on the application level. Additionally, for some sources (e.g., data dumps), a schema definition may lack completely. Techniques for schema reverse engineering and data profiling may reconstruct missing schema descriptions and constraints from the given data.

Example 1

Figure 3A:
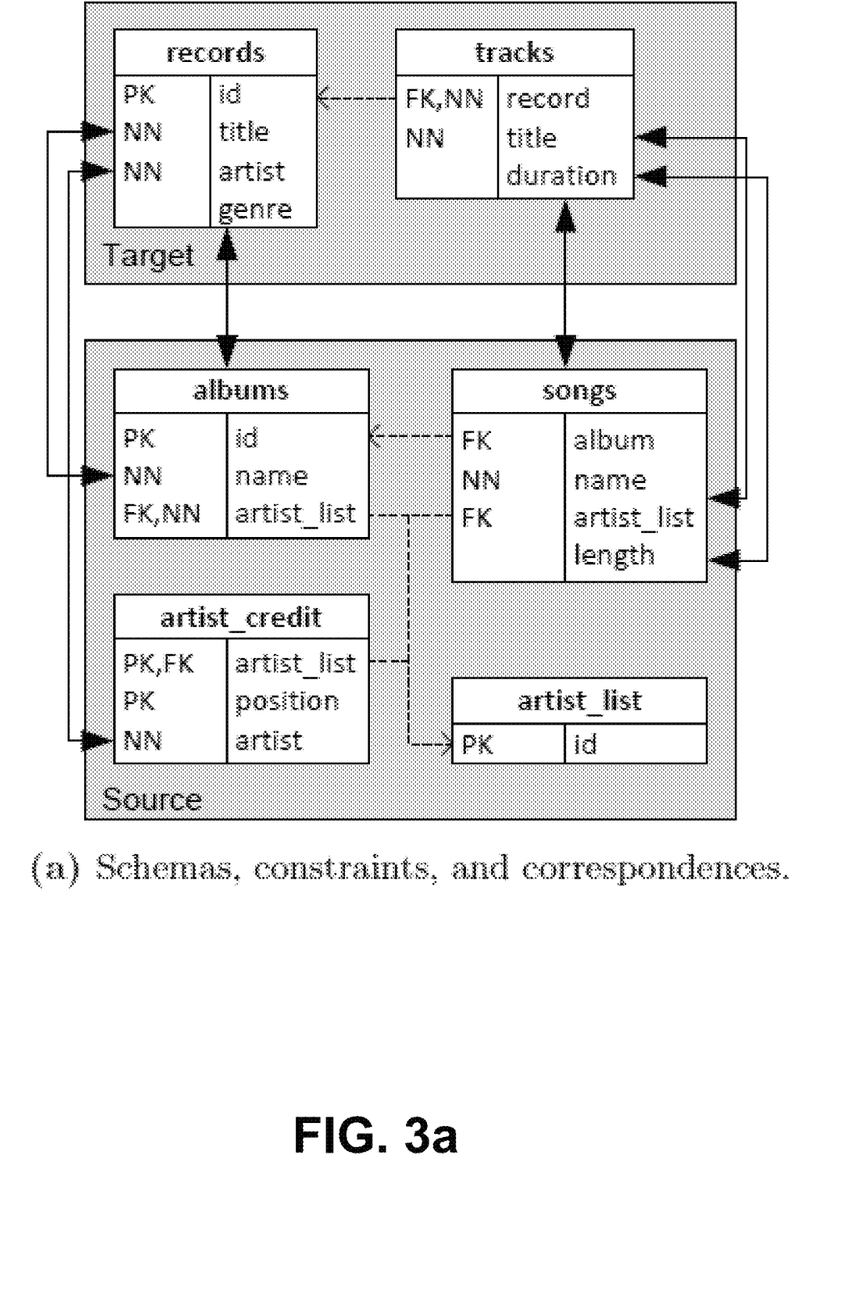

FIG. 3a shows an exemplary integration scenario with music records data. The source and target relational schemas are depicted in FIG. 3a. Solid arrows between attributes represent correspondences, i.e., two attributes that store the same atomic information. Both schemas define a set of constraints, such as primary keys (e.g., id in records), foreign keys (record in tracks, represented with dashed arrows), and not nullable values (title in tracks).

The schemas, alone, may identify problems that occur when data is integrated.

Example 2

While the target schema only addresses records and their tracks as first-class objects, the source schema also stores a list of artist credits for each album and each song. This heterogeneity in the structure may lead to problems.

In particular, the target schema may require exactly one artist value per record, whereas the source schema may associate an arbitrary number of artist credits to each album. Thus, it may be implied that any source album with zero artist credits violates the not-null constraint on the target attribute records artist. Moreover, two or more artist credits for a single source album cannot be naturally described by the single target attribute.

Embodiments of the present disclosure may allow existing data in the target database as well as constraints of the target schema. Thus, the role of multiple sources and existing target data may be emphasized. While every instance may be valid with respect to its own schemas, when data is integrated new problems may arise. For example, all sources might be free of duplicates, but there still might be duplicates across the sources when they are combined. These kinds of conflicts may also arise between source data and existing target data.

Example 3

Figure 3B:
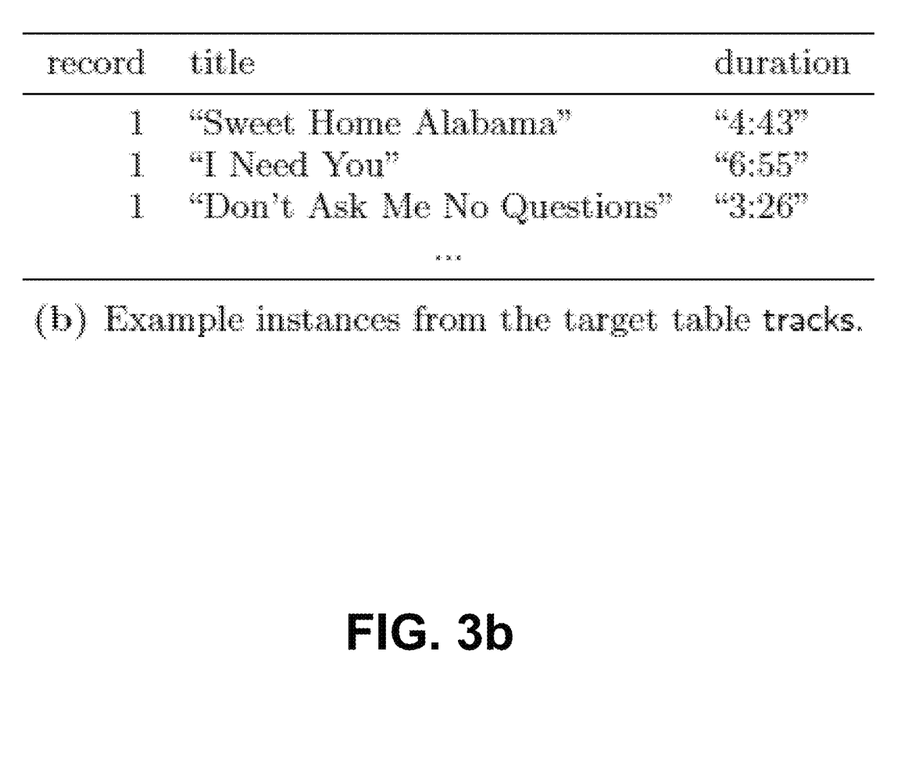
FIG. 3b depicts a table showing sample instances from the target table tracks according to one or more embodiments shown and described herein.
Figure 3C:
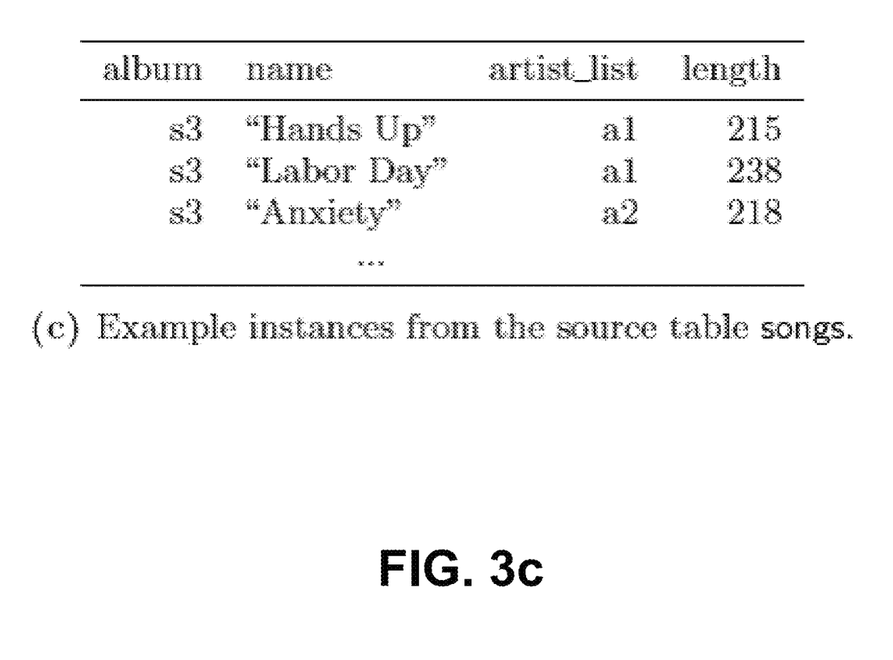
FIG. 3c depicts a table showing sample instances from the source table songs according to one or more embodiments shown and described herein, FIG. 4 schematically depicts a general architecture according to one or more embodiments shown and described herein.

FIGS. 3b and 3c report sample instances of the tracks table and the songs table, respectively. The duration of tracks may be encoded as a string with the format m:ss in the target, while the length of songs may be measured in seconds in the source. The two formats may be consistent locally, but they may need a proper transformation when combined in one column.

Finally, correspondences may be assumed between the source and target schemas to be given, as they may be semi-automatically discovered with schema matching tools. A correspondence may connect a source schema element with the target schema element, into which its contents should be integrated.

Example 4

The source table albums may correspond to the target table records and its source attribute name may correspond to the title attribute in the target. Accordingly, the albums from the source database may be integrated as records into the target database, whereas the album names in the source may serve as titles for the integrated records.

Correspondence may play a role in the estimation problem. On one hand, they may enable reasoning over the complexity of the scenario. On the other hand, they do not induce a precise mapping between sources and the target yet. For instance, they do not specify if and how source attribute values may be transformed to fit into the target schema, or how data from different tables may be combined, such as in the example scenario to obtain the artist name for integrated records.

3.2 A General Framework

Given different kinds of integration and cleansing actions, different specialized models may be needed to decode their complexity and estimate their effort properly. In order to support generality, a general effort estimation framework Efes, which accepts as plug-ins multiple submodels, can be used. Such modularity may make it easier to exchange or improve individual models and to extend the framework with new models.

Figure 4:
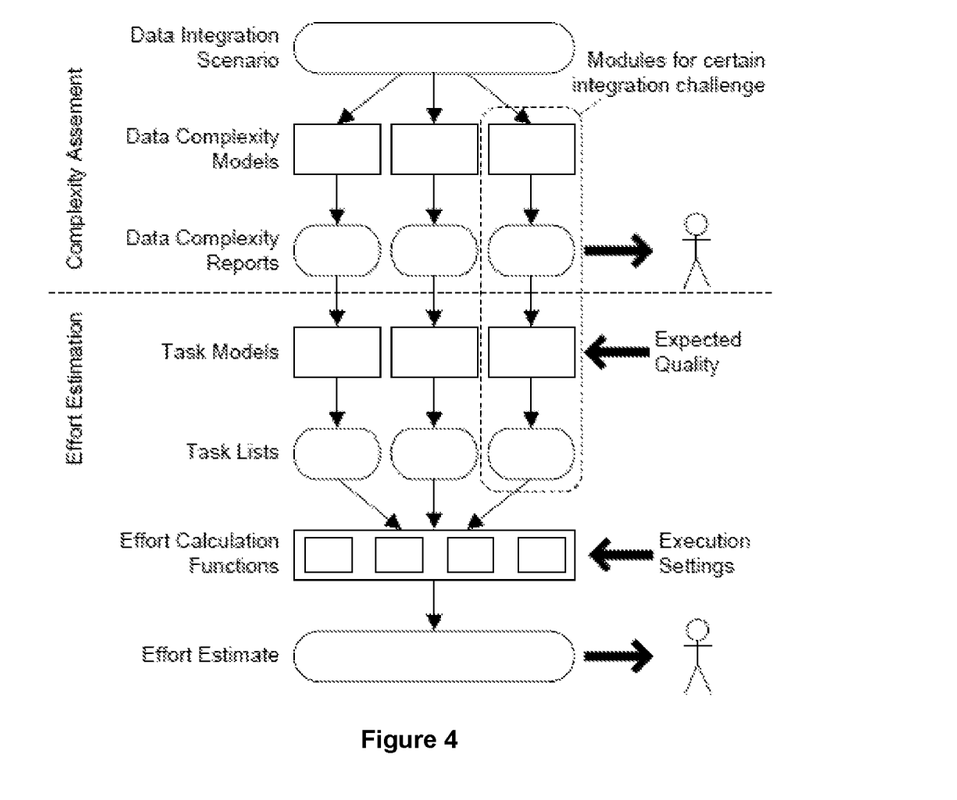

FIG. 4 depicts the general architecture of Efes according to an embodiment of the present disclosure. The architecture may divide the estimation process into an objective complexity assessment, which may be based on properties of schemas and data, followed by the subjective effort calculation, which may be context dependent and required additional input. The latter may be configurable with respect to (i) the expected quality of the integration result, and (ii) the specific execution settings. The enumerated parameters are described in greater detail below.

(i) Data cleansing, as used herein, may be defined as the operation of updating an instance of a schema such that it becomes consistent with respect to any constraint defined on the schema. However, such results may be obtained in multiple ways, for example by automatically removing problematic tuples, or by manually solving inconsistencies involving a domain expert. Each choice may imply a different effort.

Example 5

The duration format mismatch may be considered. As duration may be nullable, one way to solve the problem is to drop the values coming from the new source. A better solution is to transform the values to a common format, but this operation may require a script and a validation by the user.

(ii) The execution settings may vary. For example the execution settings may vary depending on the experience of the expert, or on the level of automation of the tools to be used in the integration steps. Again, the effort may vary largely.

Example 6

The problem with the cardinality of authors may be considered. In some embodiments, schema mappings tools may be used to automatically create a synthetic value in the target, if a source album has zero artist credits, and to automatically create multiple occurrences of the same album with different artists, if multiple artist are credited for a single source album.

The phases for complexity and effort estimation, and their execution flow are described in greater detail, according to embodiments the framework provided herein.

3.3 Complexity Assessment

Multiple data complexity models may be plugged into the framework for complexity assessment. Each model may inspect the data integration scenario with respect to one certain complexity aspect, such as structural heterogeneities between source and target schemas, or value heterogeneities like different string formats among corresponding attributes. For example, the cardinality problem for the number of artists induces structural conflicts in the integration scenario that pertain to the data complexity.

The complexity models may take as input the integration scenario and produce data complexity reports. These reports may comprise objective observations of the scenario and may not consider contextual factors like the expected quality of the integration. A structural conflict may represent a problem that must be overcome (the what) and may not estimate the effort (the how). The content of these reports may depend on the actual complexity model.

Three models were designed and tested in-Efes-. One identified structural conflicts by looking at the schemas and the constraints, one looked at problems related to the formats of the data, and the last one measured the complexity of specifying a precise and complete mapping between two schemas. Other models may be added to measure other issues related to project, such as project management (related to human resources involved) or managing infrastructure (related to the required hardware). Examplary proposed models and their complexity reports are illustrated herein.

A first model may create an integrated view of the data putting the schemas, the constraints and the correspondences together in a graph representation. Then an algorithm may count the possible problems by analysing the paths between source and target elements with their cardinalities. As provided below in Table 2, a report may list different types of violation and their occurrences by counting the problems over the data.

TABLE 2

Report listing violations and occurences.

| Problem | Number of Elements |
|---|---|
| Missing Required Value | 284 |
| Larger Cardinality | 190 |

The value model may look at the format used in attributes that are going to be merged in the target and may measure the problem they have in terms of value mismatch. This problem may occur in the duration example described above, e.g., where two sources use different formats. A report may list statistics over values problems as provided in Table 3.

TABLE 3

Report listing statistics over value problems.

| Problem | Number of Elements |
|---|---|
| Different representation | 1321 |
| Domain restricted in the target | 90 |

A further model may measure the complexity of going from correspondences to full mapping specification for every target table related to the sources by at least one correspondence. In some embodiments, the larger the number of tables, attributes, and constraints (primary and foreign keys) involved, the harder it is to design and test the mapping. A report may list target table tracks as provided in Table 4.

TABLE 4

Report for target table tracks.

| Problem | Number of Elements |
|---|---|
| # primary keys | 3 |
| # foreign keys | 4 |
| # source attributes | 8 |
| # source tables | 4 |

Data complexity reports may be an intermediate result towards an effort estimate, and may also be useful output to the user. For instance, when a user needs to select sources for data integration from a set of alternatives, how well every source matches to the target may be a useful selection criterion.

3.4 Effort Estimation

A natural approach may be used to derive an effort estimate from the data complexity reports. For example, one may specify which operations (tasks) are necessary to overcome the given problems and then calculate the effort that is necessary to execute those tasks in the specific setting.

For each complexity model, one requirement may include specifying a corresponding task model that identifies a set of operations over the data that are necessary to overcome the issues from that report. Additionally, each task model may specify different actions depending on the desired quality of the integration. Users may specify the desired quality as goal profiles. In some embodiments two profiles can be defined, namely the low effort and the high quality. Furthermore, the task may contain arbitrary parameters, such as the number of tuples violating the constraint.

Example 7

A complexity report for the scenario from FIG. 4 may state that there are albums without any artist in the source data that lead to a violation of a not-null constraint in the target. The corresponding task model may propose alternative actions to solve the problem such as: Discharge violating tuple (low effort) or Add missing value (high quality).

In the second step, the necessary effort for the execution of every task may be computed. For this purpose, the user may specify an effort-calculation function for each task type. This may reflect the user's execution settings and may thereby incorporate the parameters of the tasks. The effort estimates for all the tasks together may form the overall effort estimate.

Example 8

In the previous example, user may execute the discharge violating tuple task automatically with an integration tool. Therefore, it may be stated that this task takes always 5 minutes for configuring the tool, no matter the number of problematic elements.

For Add missing values, on the other hand, each missing artist value may need to be looked up and provided manually. Therefore, an appropriate effort estimation formula might be 3 minutes*number of violating tuples, where in general the time value may depend on the user expertise, the difficulty of the domain, and so on.

Some embodiments relate to a task-based proceeding that offers several advantages over an immediate complexity-effort mapping, such as where a formula directly converts a counting over the schemas into an effort estimation value. In fact, a tested embodiment of the model was easier to calibrate, as only the mentioned effort-calculation functions were provided to reflect the user's execution settings. It is noted that the effort for the completion of a task may substantially vary between different execution settings. For example, the availability of proper integration tools may speed such integration tasks up. Furthermore, the context of the data integration may impact the effort, e.g., creating new values for a medical drugs in a hospital may require more attention (and therefore effort) than the same task requires in the aforementioned example, where only missing artist values are to be provided. In experiments, the effort-calculation functions was often linear functions or even only constants, that have been derived heuristically. Yet, when appropriate, functions may be arbitrarily complex.

Instead of just delivering a final effort value, the estimates described herein may be broken down according to underlying tasks. Accordingly, estimates may help the users understand the required work, and also may expose the assumptions the estimate used to create an estimate. Thus, a user may be provided with the opportunity to revise the assumptions if necessary, e.g. by refining a task or plugging different models.

4 Experiments

Experimented have been conducted to show the viability of the general effort estimation architecture and different embodiments of the models. The experiments used a prototype implementation of Efes with all the aforementioned components executed on the scenarios from the case study.

The Efes Prototype:

The Efes prototype was a Java-based implementation of the effort estimation architecture. The prototype offered multiple configuration options via an XML file and was run over a command-line interface. As input, the prototype used configuration files of the ++Spicy tool, which defined correspondences between a source and a target data set. The data sets used were PostgreSQL databases.

TABLE 5

Effort calculation functions used for the experiments.

| Task | Effort function (m) |
|---|---|
| aggregate values | 3·#repetitions |
| convert values | (if # dist − vals < 120 ) 30 , (else) 0.25·# dist − vals |
| generalize values | 0.5·# dist − vals |
| refine values | 0.5·# values |
| drop values | 10 |
| add (unique) values | 2·# values |
| create tuples | 10 |
| delete detached values | 0 |
| delete tuples | 10 |
| keep any value | 10 |
| add missing tuples | 15 |
| aggregate tuples | 10 |
| delete dangling IND | 10 |
| delete dangling tuples | 15 |
| unlink all but one | 15 |
| add missing IND | 10 |
| write mapping | 3·# FKs + 3·# PKs + 1·# atts + 3·# tables |

Configuration and External Factors:

The tested scenarios included the following external factors. It was assumed that the only available software for implementing the integration were manually written SQL queries and a basic admin tool like pgAdmin. Based on these external factors, corresponding effort conversion functions were derived heuristically to configure Efes. For example, in the formula for adding values, it was assumed that a practitioner takes two minutes to investigate and provide a single missing value. In contrast, deleting tuples with missing values was assumed to take ten minutes, because an appropriate SQL query may perform this task independent of the number of violating tuples.

Case Study Results:

The correspondences created for the case study data sets were fed into Efes to compare its effort estimates to the actually spent effort. Experimental results are reported herein for low-effort integration profile, since the integration conducted during the case study was neither aiming for high-quality integration results nor were any missing required values complemented at any point.

Figure 5:
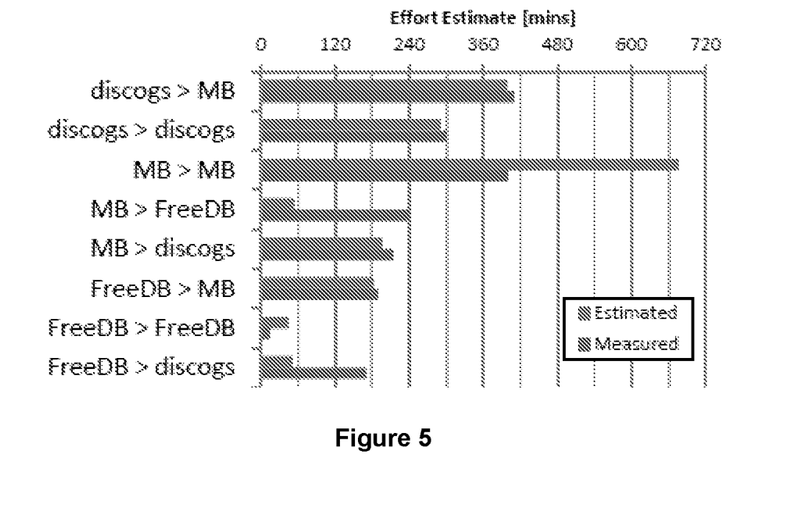
FIG. 5 depicts a graph showing the results of experiments according to one or more embodiments shown and described herein.

FIG. 5 depicts the experimental results. For some scenarios, the estimated and actual effort are really close, while for others there are larger deviations.

When having a closer look on how the effort estimates are composed, many of the chosen tasks reflect the actual proceeding in the case study, while others do not. For example, the effort value transformation functions that were created in the case study are not reflected in the estimate due to the low-effort profile.

The generality of the presented comparison should be considered. The case study used real-world data sets with different complexity and quality. Thus, they may provide a practical and relevant use case. However, there may be a large effort/quality trade-off in data integration scenarios, and in the case study, only the effort-saving way has been taken. Accordingly, data cleansing steps that go beyond the fixing of schema constraint violations may be scrapped. Example data cleansing steps may include the issues that are handled by the value fit and transform model.

Nevertheless, within this experiment's scope, the results in the case study indeed show the viability of proposed approach. The root-mean-square error for the estimations, which is calculated as $$rmse = \sqrt{\frac{\sum_{scenarios}\left(\frac{\text{measured}(s) - \text{estimated}(s)}{\text{measured}(s)}\right)}{\text{\# scenarios}}},$$

amounts to approximately 0.815. So, according to this evaluation, in a data integration scenario for a given effort estimate e, it would be reasonable to expect the actual effort not to exceed a value $$\left(\frac{e}{5}, 2e\right),$$

which is by far more precise than an order-of-magnitude estimate.

Moreover, Efes was not trained with data. It is believed that having training data may help in finding configurations for more accurate estimates. For example, the training data may provide a break down of the effort spent for the different tasks.

When used in this specification and claims, the terms "comprises" and "comprising" and variations thereof mean that the specified features, steps or integers are included in an open ended manner. The terms are not to be interpreted to exclude the presence of other features, steps or components.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A computer implemented method for integrating data into a target database, the method comprising:
   providing a plurality of source databases which each comprise a relational schema and the data for integration into the target database;
   identifying a correspondence between data for a source element and a target element of the each source database and the target database;
   identifying at least one integration challenge and, providing an extensible automatic effort estimation framework (Efes) which utilizes a plurality of plug-ins submodels to resolve the at least one integration challenge, the plurality of plug-ins submodels are configured to:
   generate at least one complexity model based on the relational schema and the identified correspondence between the source element and target element data of each source database, each complexity model indicating at least one inconsistency between two or more of the data sources which must be resolved to integrate the data from the data sources into the target database;
   generate an effort model comprising an effort value for each inconsistency indicated by each complexity model using integration tools to integrate the source element into the target element, each effort value indicating cost required to resolve the inconsistency to integrate data from the data sources into the target database; and
   integrate data from at least one of the source databases into the target database.

2. The method of claim 1, wherein the method further comprises:
   comparing the effort values for a plurality of data sources; and
   selecting at least one data source that produce a minimum effort value for integration into the target database.

3. The method of claim 1, wherein the method further comprises:
   outputting at least one effort value to a user for the user to determine from the effort value the effort required to integrate data into the target database.

4. The method of claim 1, further comprising generating the effort model using a goal profile wherein the goal profile is based on task models, wherein the task model is a specified set of operations on the data.

5. The method of claim 1, further comprising generating the effort model using an effort-calculation function for each task type, wherein the task type is an operation on the data.

6. The method of claim 1, wherein the method further comprises generating a graph using the at least one complexity model to indicate the parts of the schema of the target database that are more complex than other parts of the schema of the target database.

7. The method of claim 1, wherein generating the complexity model is independent of the language used to express the data transformation, the expressiveness of the data model and the constraint language.

8. The method of claim 1, further comprising generating the complexity model using integration tools to inspect a plurality of single attributes of each data source.

9. The method of claim 1, wherein the method comprises generating a plurality of complexity models based on the relational schema and data of each source database.

10. The method of claim 1, wherein the method further comprises:
receiving at least one sub-model for use with each effort model and each complexity model to exchange, improve or extend each effort model or each complexity model.

11. The method of claim 10, wherein the method comprises receiving a plurality of data complexity sub-models, each data complexity sub-model representing the data integration scenario with respect to one certain complexity aspect.

12. The method of claim 1, wherein the method further comprises:
comparing the effort values for a plurality of data sources;
selecting at least one data source that produce a minimum effort value for integration into the target database; and
outputting at least one effort value to a user for the user to determine from the effort value the effort required to integrate data into the target database.

13. The method of claim 1, wherein the method further comprises:
comparing the effort values for a plurality of data sources; and
selecting at least one data source that produce a minimum effort value for integration into the target database; and
wherein generating the complexity model is independent of the language used to express the data transformation, the expressiveness of the data model and the constraint language.

14. A non-transitory computer readable storage medium storing instructions which, when executed by a computer, cause the computer to:
provide a plurality of source databases which each comprise a relational schema and the data for integration into the target database;
identify a correspondence between data for a source element and a target element of the each source database and the target database;
identify at least one integration challenge and, provide an extensible automatic effort estimation framework (Efes) which utilizes a plurality of plug-ins submodels to resolve the at least one integration challenge, the plurality of plug-ins submodels are configured to:
generate at least one complexity model based on the relational schema and the identified correspondence between the source element and target element data of each source database, each complexity model indicating at least one inconsistency between two or more of the data sources which must be resolved to integrate the data from the data sources into the target database;
generate an effort model comprising an effort value for each inconsistency indicated by each complexity model using integration tools to integrate the source element into the target element, each effort value indicating cost required to resolve the inconsistency to integrate data from the data sources into the target database; and
integrate data from at least one of the source databases into the target database.

15. A system for integrating data into a target database, the system comprising computing device which incorporates a processor and a memory, the memory storing instructions which, when executed by the processor, cause the processor to:
provide a plurality of source databases which each comprise a relational schema and the data for integration into the target database;
identify a correspondence between data for a source element and a target element of the each source database and the target database;
identify at least one integration challenge and, provide an extensible automatic effort estimation framework (Efes) which utilizes a plurality of plug-ins submodels to resolve the at least one integration challenge, the plurality of plug-ins submodels are configured to:
generate at least one complexity model based on the relational schema and the identified correspondence between the source element and target element data of each source database, each complexity model indicating at least one inconsistency between two or more of the data sources which must be resolved to integrate the data from the data sources into the target database;
generate an effort model comprising an effort value for each inconsistency indicated by each complexity model using integration tools to integrate the source element into the target element, each effort value indicating cost required to resolve the inconsistency to integrate data from the data sources into the target database; and
integrate data from at least one of the source databases into the target database.

* * * * *